(12) United States Patent
Fishel et al.

(10) Patent No.: US 11,864,682 B2
(45) Date of Patent: Jan. 9, 2024

(54) MANUFACTURE OF A PAN COVERED WITH PAPER

(71) Applicants: Shmuel Fishel, Bnei Brak (IL); Abraham Natan Bar On, Ganei Modi'in (IL); Alexsander Shmuel Bar On, Jerusalem (IL)

(72) Inventors: Shmuel Fishel, Bnei Brak (IL); Abraham Natan Bar On, Ganei Modi'in (IL); Alexsander Shmuel Bar On, Jerusalem (IL)

(*) Notice: Subject to any disclaimer, the term of this patent is extended or adjusted under 35 U.S.C. 154(b) by 989 days.

(21) Appl. No.: 16/179,946

(22) Filed: Nov. 4, 2018

(65) Prior Publication Data

US 2019/0069705 A1 Mar. 7, 2019

Related U.S. Application Data

(63) Continuation-in-part of application No. 14/910,038, filed as application No. PCT/IL2013/050673 on Aug. 8, 2013, now Pat. No. 10,117,543.

(51) Int. Cl.
| | |
|---|---|
| *A47J 27/00* | (2006.01) |
| *A47J 27/04* | (2006.01) |
| *A47J 37/01* | (2006.01) |
| *A47J 36/02* | (2006.01) |
| *A47J 36/06* | (2006.01) |

(52) U.S. Cl.
CPC ............. *A47J 27/04* (2013.01); *A47J 36/022* (2013.01); *A47J 37/01* (2013.01); *A47J 27/002* (2013.01); *A47J 36/06* (2013.01)

(58) Field of Classification Search
CPC ......... A47J 27/04; A47J 36/022; A47J 36/06; A47J 37/01; A47J 27/002; B21D 51/18; B21D 51/22; B21D 22/02; B23K 20/02; B23K 2101/34; B23P 2700/05; B65D 81/34; B65D 81/343; B65D 81/3813; B65D 81/3823; B65D 21/00; B65D 21/0233; B65D 21/0234; B65D 1/128; B65D 1/34; B65D 1/28; B65D 5/56; B65D 21/14
See application file for complete search history.

(56) References Cited

U.S. PATENT DOCUMENTS

| | | | | |
|---|---|---|---|---|
| 2,174,425 | A * | 9/1939 | Schlumbohm | A47J 36/022 220/573.1 |
| 3,796,174 | A * | 3/1974 | Wilson | B23P 11/00 72/186 |
| 5,203,491 | A * | 4/1993 | Marx | A21B 3/131 220/573.1 |
| 6,149,053 | A * | 11/2000 | Chatterton | B65D 1/26 220/608 |
| 2007/0267374 | A1* | 11/2007 | Middleton | B65D 43/169 211/126.1 |
| 2013/0161337 | A1* | 6/2013 | Skopis | A21B 3/131 220/573.4 |

* cited by examiner

*Primary Examiner* — Nirvana Deonauth
(74) *Attorney, Agent, or Firm* — Dr. Hanan Farber Patent Agent Ltd.

(57) ABSTRACT

A metallic pan having an upper surface including a cavity and an upper lip surrounding the cavity. Paper covers the upper surface including the upper lip of the metallic pan. The paper is attached within folds of metallic foil of the metallic pan.

17 Claims, 9 Drawing Sheets

MANUFACTURE OF A PAN COVERED WITH PAPER

CROSS REFERENCE TO RELATED APPLICATIONS

The present application is a continuation-in-part of pending U.S. patent application Ser. No. 14/910,038 filed Feb. 4, 2016 which is a national stage entry of international application PCT/IL2013/050673, filed Aug. 8, 2013.

FIELD AND BACKGROUND

1. Technical Field

The present invention relates to the field of pan manufacture.

2. Description of Related Art

Baking pans come in a variety of shapes and sizes, disposable baking pans are often used for baking and serving foods. As most disposable pans are made of aluminum, other disposable pans are sometimes made by partial or by totally recyclable material such as cured cardboards. Although disposable baking pans are designed for cooking purposes, they are often used as trays for serving foods whether hot or cold.

Baking paper, sometimes referred to by the art as parchment paper, is often used to eliminate the need to grease pans in order to prevent food from sticking to the pans. Modern baking paper is made by rolling paper rolls through a bath of sulfuric acid or zinc chloride. This process yields a sulfurized cross-linked material with properties such as high density, stability, and heat resistance, thus having a non-stick quality. Alternatively, the non-stick quality can be obtained by coating a paper with a suitable agent such as silicone having a low surface energy and the capability to withstand high temperatures. Although baking paper can be also used as a wax paper for wrapping sandwiches for example, wax paper cannot be used as baking paper as it lacks the quality to withstand high temperatures. Baking paper is sometimes used for steaming or cooking within closed pouches made from the baking paper itself, a technique which is sometimes referred to as en papillote cooking. Baking paper is usually purchased by the consumer in rolls or in pre-cut rectangles, thereby requiring the user to cut or to fold the baking paper to fit the pan in which it is to be used. Folding the baking paper may be quite tricky as it is a somewhat shape remembering material. Some attempts have been made to facilitate baking procedures associated with baking papers.

U.S. Pat. No. 5,721,022 to MORITA teaches of two types of disposable pans made from a paper sheet material to prevent its paper configuration from easily deforming and/or to prevent its bottom portion from easy burning or scorching. One type includes a bowl-like concave part having a bottom portion and an opening divergent part extended upwards from the concave part. This necessitates a specific supporting means when used with a cooking oven. The other type additionally includes a flange part interposed between the two parts and can be used without any supporting means. In order to prevent the paper configuration from easy deforming, a multiple folds are provided on the opening divergent part to have the overlapped width small, and/or a synthetic resin is laminated on the paper sheet material. In order to prevent the bottom portion from easily burning, the inner upper surface of said bottom portion is provided with one or plural projections, a metallic foil or sheet is laminated on the outer back surface of said bottom portion, and/or the paper sheet material is impregnated with a surface active agent or the like.

Japanese patent application JP2010207117 to KEI teaches a process for making a baking paper for preventing the inner surface of a container from directly contacting bread dough, and having a glazed surface with a treating agent for easy peeling off from the formed bread after the maturing treatment.

U.S. Pat. No. 7,163,120 to BLUCHER teaches of an apparatus, system, and method for forming an improved barrier between a pan and a substance, such as food, contained therein using a contour fit pan liner. The apparatus includes a pan liner having a contoured bottom edge that is custom fit within a food service pan to cover an interior surface of the pan. The contoured edge of the pan liner conforms to the shape and size of the food service pan and does not have any dog ears, ears, or tails that are typical of conventional pan liner. The liner is disposed within the food receptacle area of the pan to cover the interior surface of the pan and the top of the liner is folded over the top opening of the pan.

BRIEF SUMMARY

Various methods are provided herein for manufacturing a covered pan including a metallic pan having a previously determined shape and paper inside the metallic pan covering a surface of the pan. The paper retains a shape corresponding to the shape of the metallic pan. A first roll of metallic foil is mounted on a first roller. A second roll of paper is mounted on a second roller. The metallic foil from the first roll and the paper from the second roll is simultaneous fed and driven adjacent and parallel to each other into a press machine. The metallic foil and paper are pressed together to manufacture thereby the covered pan including the metallic pan having the previously determined shape and the paper retaining the shape corresponding to the shape of the metallic pan. The metallic foil together with the paper may be shaped to the previously determined shape while pressing together the metallic foil and the paper. The metallic pan may be attached to the paper by crimping and/or folding the metallic foil together with the paper while pressing together the metallic foil and the paper. The metallic foil is die cut by the pressing machine together with the paper. The metallic foil may be composed of an alloy substantially of aluminum. The paper may be a baking paper configured to withstand baking temperatures.

Various covered pans are provided for herein, including a metallic pan having a previously determined shape and paper inside the metallic pan covering a surface of the pan. The paper retains a shape corresponding to the shape of the baking pan. The covered pans are manufactured by a process disclosed herein.

Various covered pans are provided for herein including a metallic pan having an upper surface including a cavity and an upper lip surrounding the cavity. Paper entirely covers the upper surface including the upper lip of the metallic pan. The paper is attached within folds of metallic foil of the metallic pan. The paper retains a shape corresponding to a shape of the baking pan. The metallic foil may be composed of an alloy substantially of aluminum. The paper may be a baking paper configured to withstand baking temperatures. The folds may be created by pressing the metallic foil with the paper during manufacture of the covered pan from the metallic foil.

The foregoing and/or other aspects will become apparent from the following detailed description when considered in conjunction with the accompanying drawing figures.

BRIEF DESCRIPTION OF THE DRAWINGS

The invention is herein described, by way of example only, with reference to the accompanying drawings, wherein.

Figure 1:
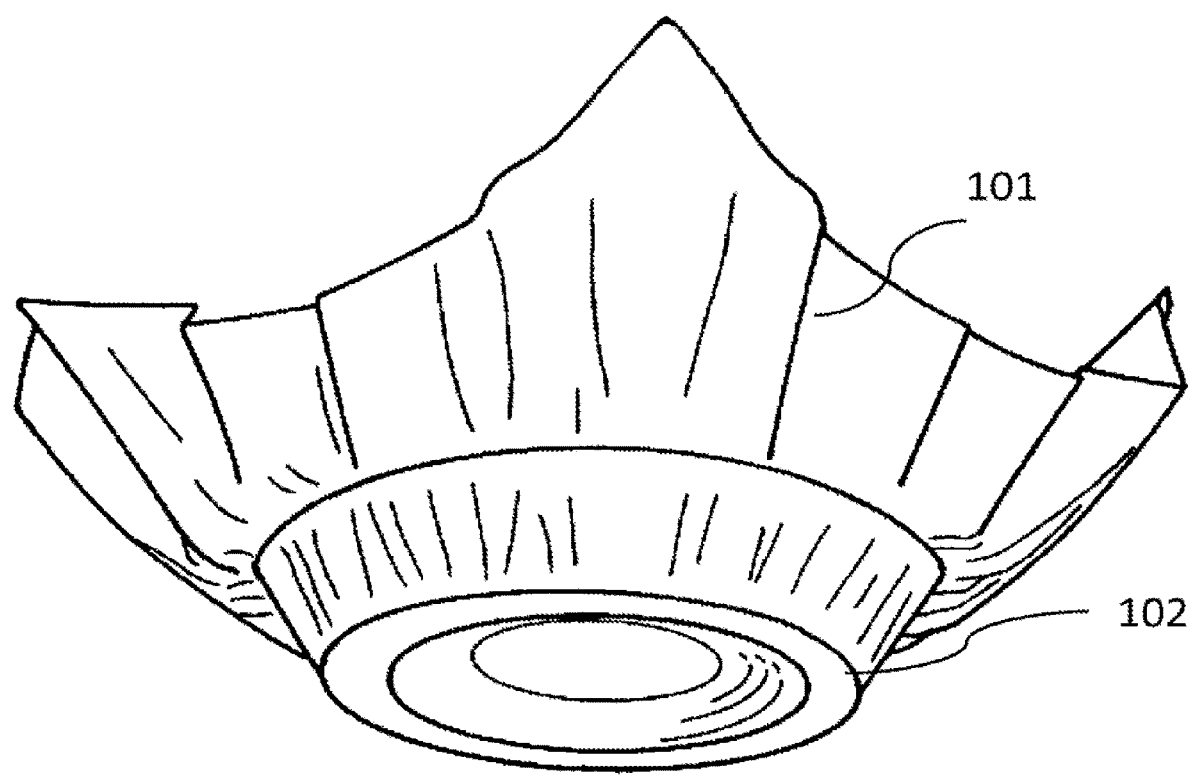
FIG. 1 schematically shows a disposable pan depicted by the prior art.

The foregoing and/or other aspects will become apparent from the following detailed description when considered in conjunction with the accompanying drawing figures.

DETAILED DESCRIPTION

Reference will now be made in detail to embodiments of the present invention, examples of which are illustrated in the accompanying drawings, wherein like reference numerals refer to the like elements throughout. The embodiments are described below to explain the present invention by referring to the figures.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

FIG. 1 schematically shows a disposable pan depicted by the prior art. U.S. Pat. No. 5,721,022 to MORITA teaches of a disposable pan 101 made from a paper sheet material and form a paper cover having multiple wrinkles 102.

Figure 2:
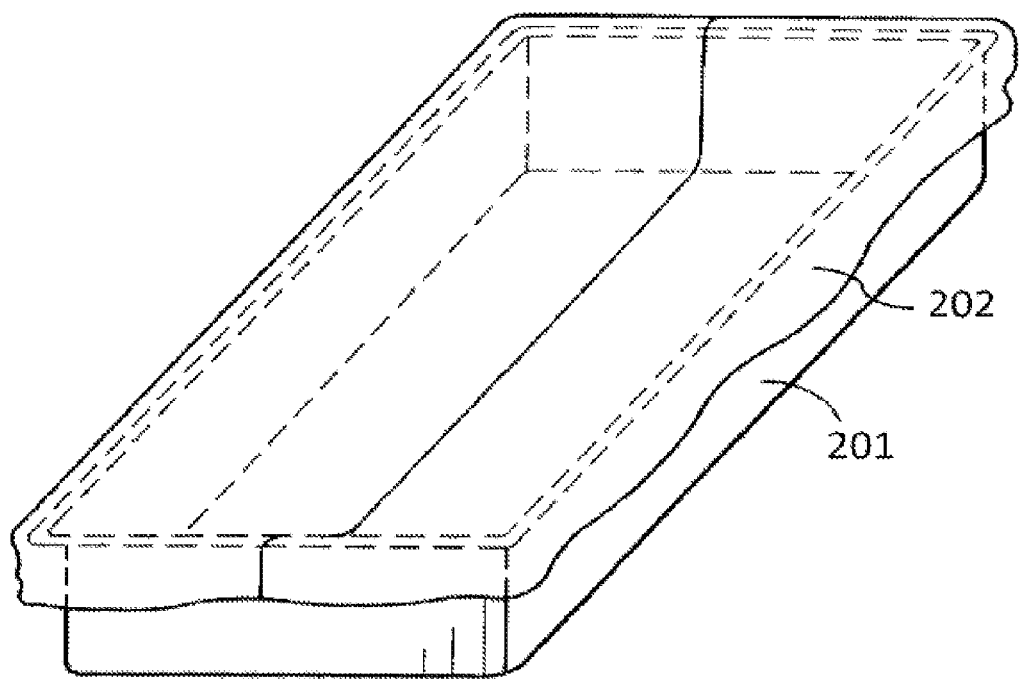
FIG. 2 schematically shows an apparatus for forming an improved barrier between a pan and food as depicted by the prior art.

FIG. 2 schematically shows an apparatus for forming an improved barrier between a pan and food as depicted by the prior art, U.S. Pat. No. 7,163,120 to BLUCHER which teaches a method for forming a barrier between a pan 201 and a food substance by a plastic liner 202.

Figure 3:
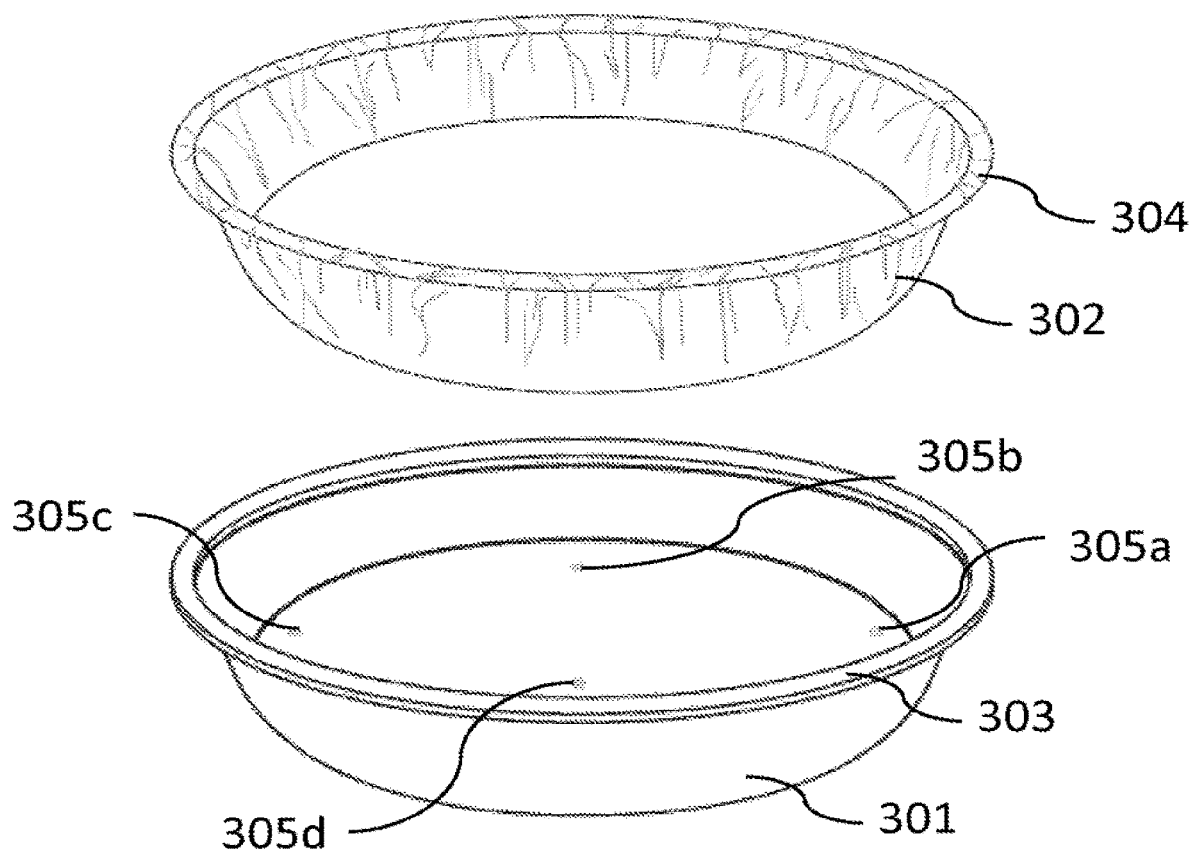
FIG. 3 schematically shows a perspective view of a disposable pan with a detachable corresponding baking paper.

FIG. 3 schematically shows a perspective view of a disposable pan 301 with a detachable corresponding disposable baking paper 302, according to an embodiment of the present invention. Disposable pan 301 and disposable baking paper 302 have corresponding lips 303 and 304 respectively. Disposable pan 301 and disposable baking paper 302 may be attached by an adhesive applied to a few areas 305a, 305b, 305c, 305d of disposable pan 301 before disposable baking paper 302 is placed over it during the manufacturing process. The adhesive 305a-305d may be applied to hold the baking paper in place and to assist separating a set of a disposable pan 301 with the disposable baking paper 302 from a nested stack of such sets as further depicted in FIG. 6. Adhesive 305a-305d may be based on an edible material based on tylose powder for example. The adhesive may alternatively be sprayed, smeared or applied in another way to the surface, to the sides or to the lips of the disposable container to hold in place disposable baking paper 302. The use of a disposable pan 301 together with corresponding disposable baking paper 302 as a set simplifies the need to cut the disposable baking paper from a roll trying to fold it and to fit it to the contour of a disposable pan. Moreover, the detachability of the baking paper 302 from the disposable pan 301 allows one to use the disposable pan 301 not once but twice: once with the baking paper 302 and again after detaching the baking paper 302 from the disposable pan 301. Because edible adhesive 305a-305d may be attached softly to the disposable pan 302 one can simply peel-off baking paper 302 from disposable pan 301 to allow another use of disposable pan 301. Edible adhesive 305a-305d ensures that remains of the edible adhesives 305a-305d over the disposable pan 301 after the disposable baking paper 302 is peeled-off does not have an adverse effect when coming in direct contact with food placed on the disposable pan 302 during the second use. The disposable pan 301 is made by aluminum; alternatively, the disposable pan 301 can be made by other materials such as paper.

Figure 4A:
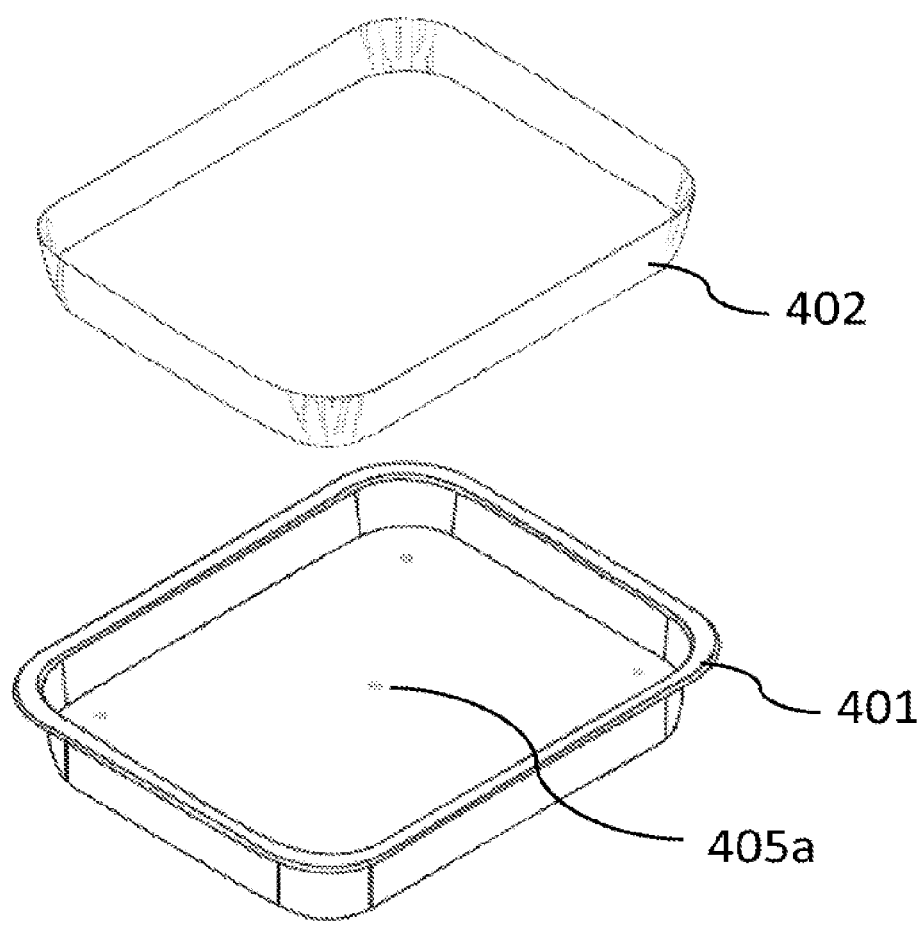
FIG. 4a and FIG. 4b schematically show a perspective view of a disposable pan with a corresponding baking paper and a baking paper lid.
Figure 4B:
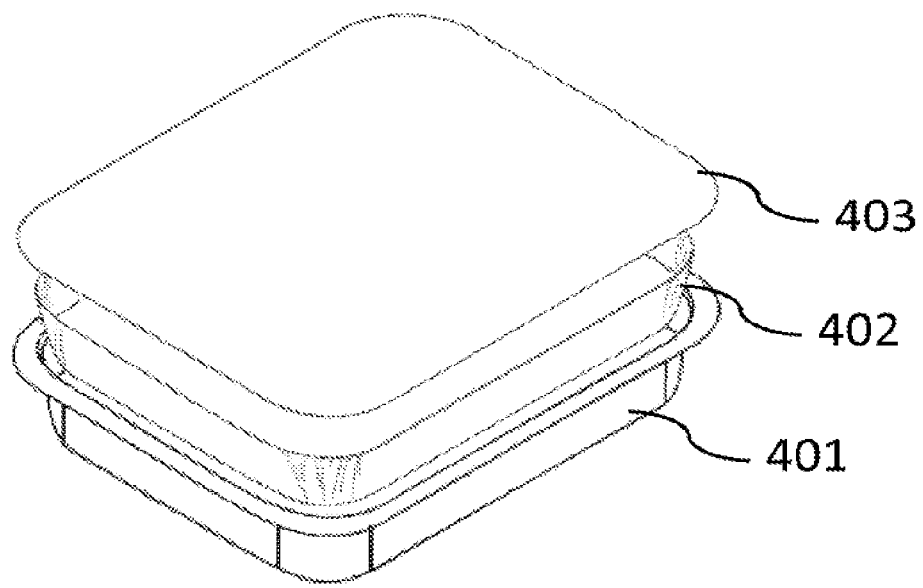

FIG. 4a and FIG. 4b schematically show a perspective view of a disposable pan 401 with a corresponding disposable baking paper 402 and a corresponding disposable baking paper lid 403, according to an embodiment of the present invention. The disposable pan 402 includes a lip with a vertical contour 404 to allow manual attachment of the disposable baking paper lid 403 to the disposable baking pan 401, if so desired. The attachment of the disposable baking paper lid 403 can be used for steam cooking, sometimes also referred to as en papillote cooking. In this configuration, the food does not come in contact with the disposable pan 401 at all. After the cooking, the user can choose whether to detach the baking paper 402 which is attached to the baking pan by a soft edible adhesive 405 and to reuse the baking pan 401 or to dispose the disposable baking pan 401 along with the disposable baking paper 402 and the disposable baking paper lid 403. The disposable baking paper lids can be provided with the set of the disposable baking pans with the disposable baking papers or can be provided as a separate stack or manually cut from a baking paper roll. The disposable baking paper pans and their corresponding disposable baking papers and lids can come in variable shapes and sizes, with or without lips and with or without a lip having a vertical contour for attaching a lid.

Figure 5A:
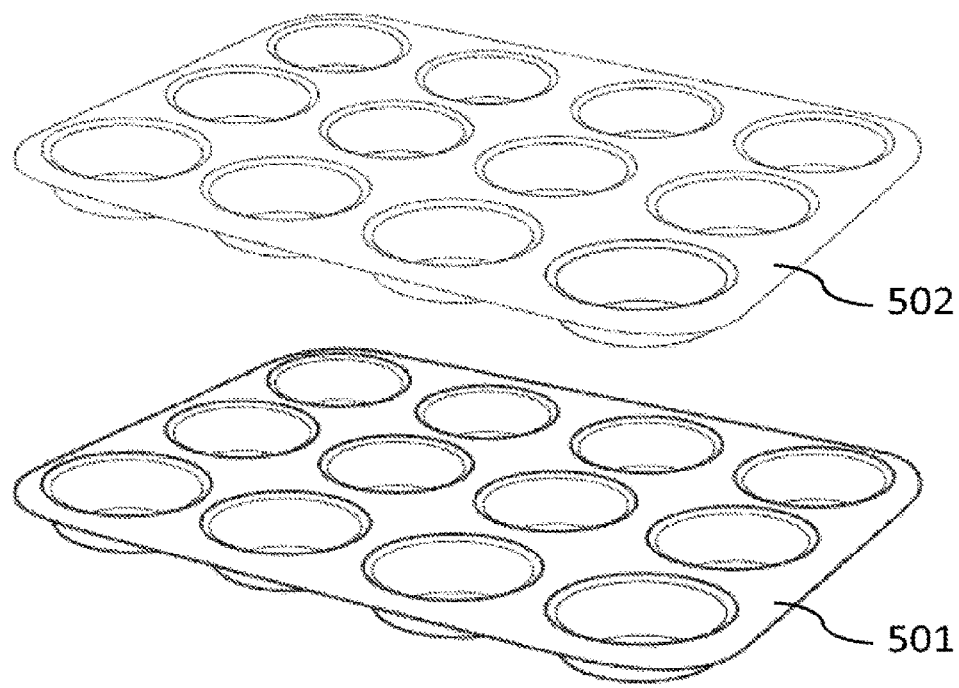
FIG. 5a and FIG. 5b schematically show a perspective view of a disposable cupcake pan with a corresponding baking paper having partial pre-cuts in the forms of the cupcakes.
Figure 5B:
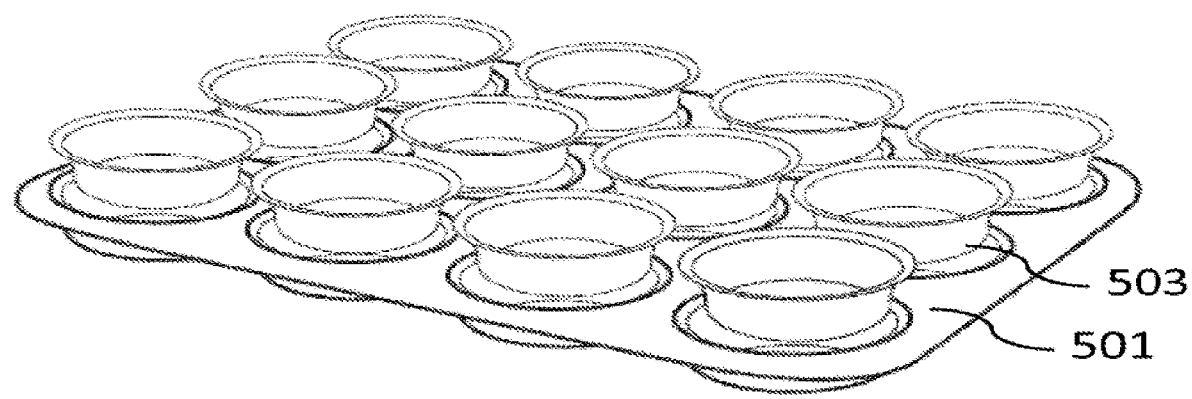

FIG. 5a and FIG. 5b schematically show a perspective view of a disposable cupcake pan 501 with a corresponding disposable baking paper 502 having partial pre-cuts in the forms of the cupcakes, according to an embodiment of the present invention. The disposable baking paper 502 includes multiple cavities which are achieved by pressing during the manufacturing process. Disposable baking paper 502 can be attached with a soft heat resistant adhesive to the baking pan 501 or alternatively, placed inside the baking pan 501 without an adhesive, the corresponding cavities between the baking pan 501 and the baking paper 502 will ensure that the baking paper 501 is kept in place. Detaching the baking paper 502 form the baking pan 501 after cooking may be simpler due to the fact that the baking paper 502 is made by a single paper sheet rather than precut cupcake shaped baking papers which are sometimes used. Moreover, detachment of the cupcakes after cooking from the single baking paper 502 sheet is also much simpler due to the same reason. FIG. 5b depicts a set of pre-cut cupcake shaped baking papers 503 which come as a set inside a disposable baking pan 501, alternatively, the baking paper single sheet 502 can have pre-cut slits around each cavity to allow detachment of individual cupcake shaped baking papers 503 as required.

Figure 6A:
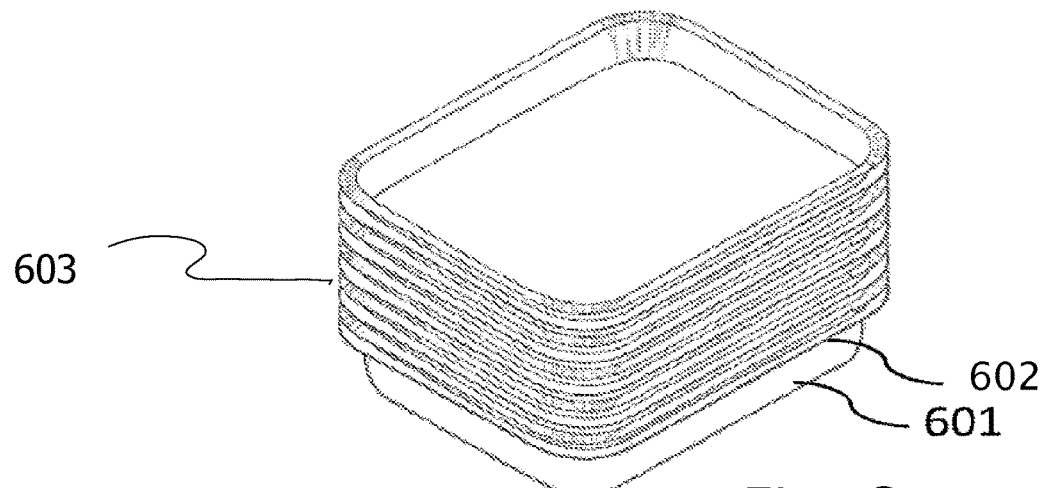
FIG. 6a-FIG. 6c schematically show a perspective view of sets of disposable pans with corresponding baking paper nesting one inside of the other.
Figure 6B:
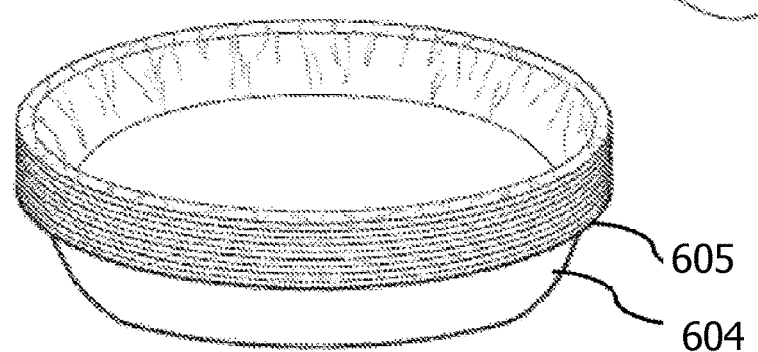
Figure 6C:
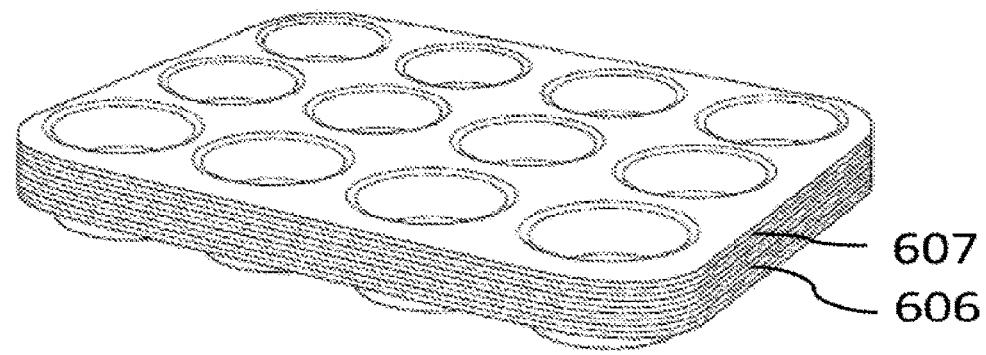

FIG. 6a-FIG. 6c schematically show a perspective view of sets of disposable metallic pans 601 each with corresponding baking paper 602 nesting one inside of the other, according to embodiments of the present invention. Disposable baking trays made of aluminum 601 and having a corresponding disposable baking paper 602 attached thereto are provided as sets 603 nested one inside of the other. The nesting of sets 603 facilitates shipping and storing of large numbers of the sets 603. In addition, the nesting also ensures that each baking paper is kept in place inside its corresponding baking pan without the need to use adhesives or alternative attachment means. FIG. 6b depicts disposable metallic, e.g. aluminum pans 604 with corresponding disposable baking papers 605 nested one inside of the other. FIG. 6c depicts disposable cupcakes metallic, e.g. aluminum pans 606 with corresponding baking paper sheets 607 nested one inside of the other.

Figure 7A:
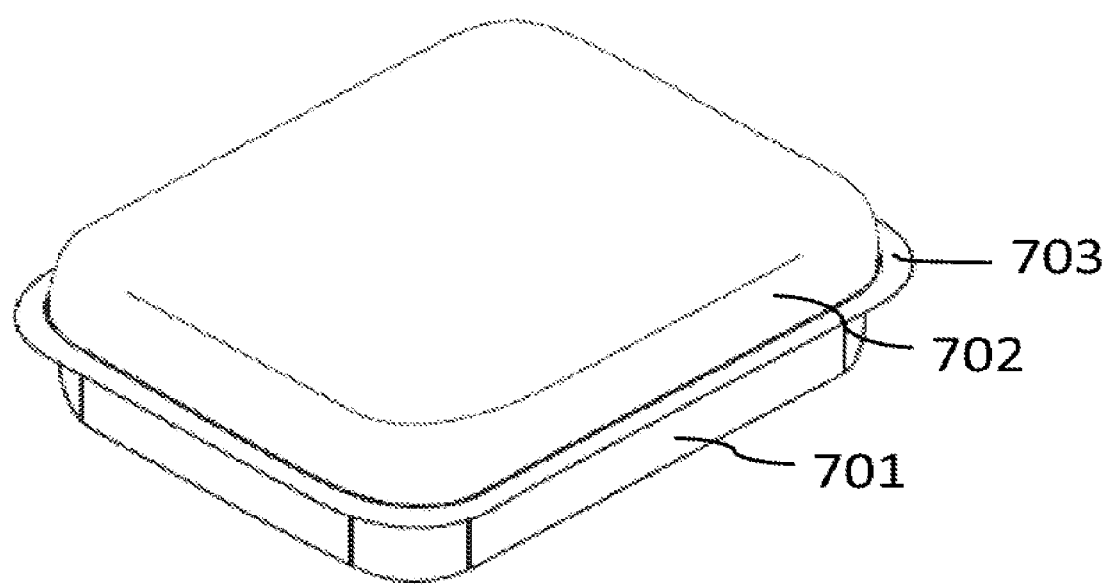
FIG. 7a and FIG. 7b schematically show a perspective view of disposable pans having two corresponding disposable backing papers one of which serves as a lid when attached upside down to the disposable pan.
Figure 7B:
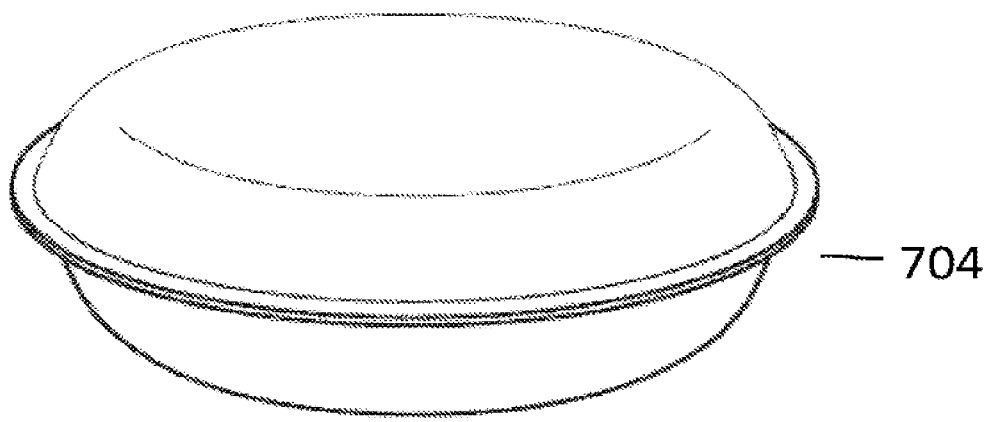

FIG. 7a and FIG. 7b schematically show a perspective view of disposable pans having two corresponding disposable baking papers one of which serves as a lid when attached upside down to the disposable pan, according to an embodiment of the present invention. Disposable pan 701 may come as a set with two corresponding disposable baking papers, one of the disposable baking papers (not shown) is attached on to the disposable baking pan 701 and the other disposable baking paper 702 is turned upside down and attached as a lid to the disposable baking pan 701 via a lip with a vertical contour 703 to allow manual attachment of the disposable baking paper lid 702 to the disposable baking pan 701. The attachment of the disposable baking paper lid 702 can be used for steam cooking, sometimes also referred to as en papillote cooking. In this configuration, the food does not come in contact with the disposable pan 701 at all. After the cooking, the user can choose whether to detach the baking paper which is attached to the baking pan 701 by a soft edible adhesive (as depicted in FIG. 4) and to reuse the baking pan 701 or to dispose the disposable baking pan 701 along with the disposable baking paper (not shown) and the disposable baking paper lid 702. FIG. 7b depicts a rounded shaped disposable baking pan 704 with a set of two corresponding disposable baking papers as depicted in FIG. 7a mutatis mutandis.

Figure 8:
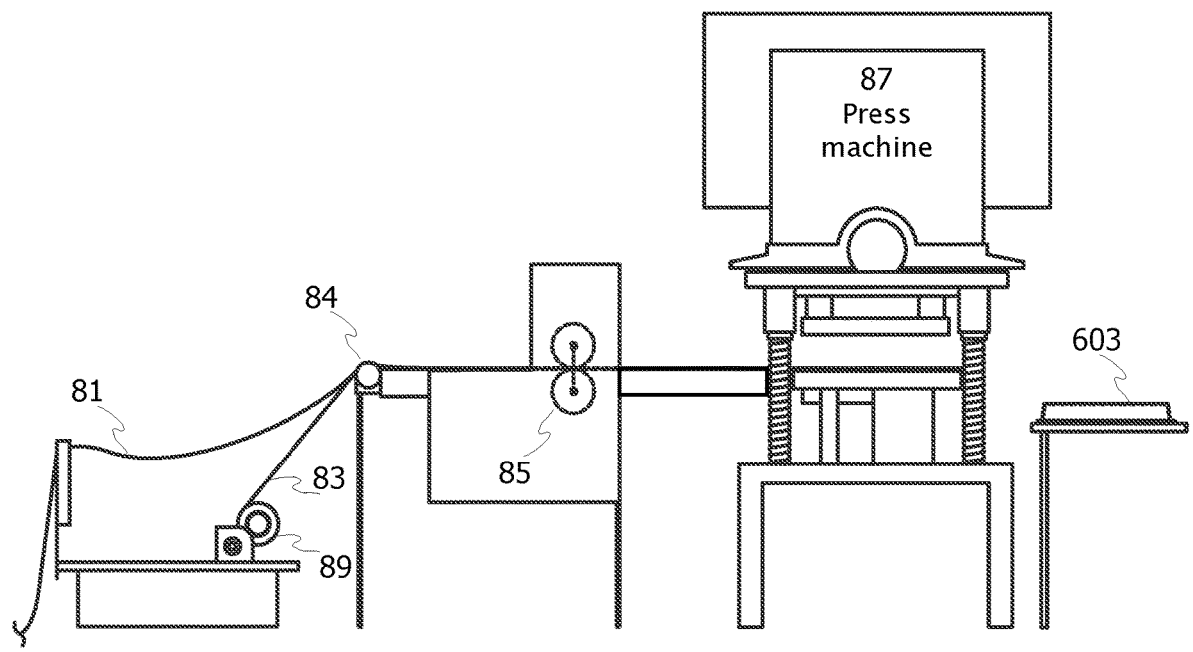
FIG. 8 shows schematically a manufacturing system, according to an embodiment of the present invention for producing baking paper covered disposable baking pans.
Figure 9:
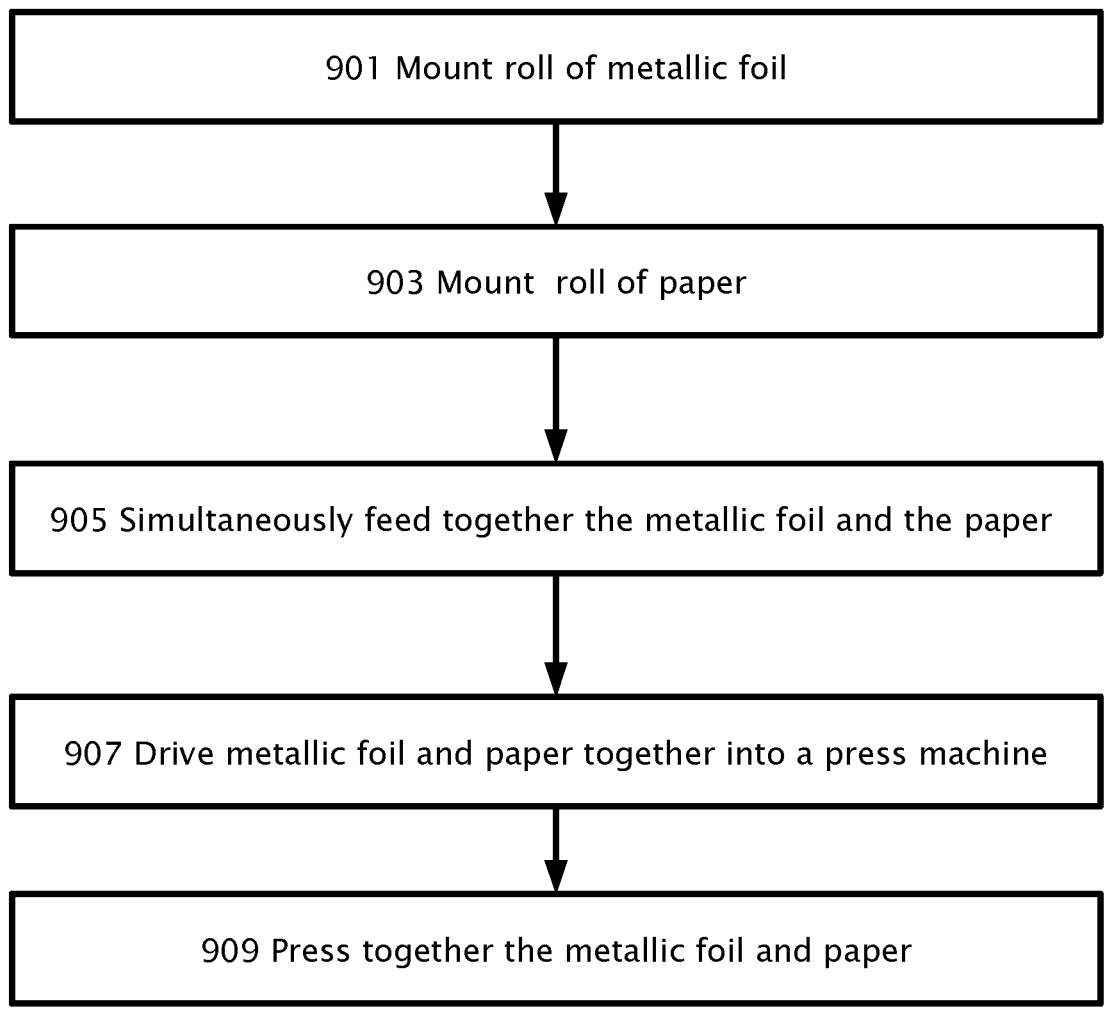
FIG. 9 is a simplified flow diagram, according to an embodiment of the present invention of a manufacturing process for producing baking paper covered disposable baking pans.

Reference is now made to FIG. 8 which illustrates schematically a manufacturing system 80, according to an embodiment of the present invention for producing paper covered metallic pans, for instance disposable aluminum foil pans for baking, roasting or serving. Reference is also made to FIG. 9 which is a simplified flow diagram of a manufacturing process 90 for producing paper covered metallic pans. By way of example, a roll of aluminum foil 81 is mounted (step 901) on a roller (not shown in FIG. 8). A roll of paper 83, e.g. baking paper, is mounted (step 903) on a roller 89. Aluminum foil 81 and paper 83 are simultaneously fed together optionally using another roller 84. Drive rollers 85 may be used to simultaneously drive (step 907) both foil 81 and paper 83 in parallel and adjacent to each other into a press machine 87. Press machine 87 cuts, presses, folds, shapes, and/or crimps step 909 aluminum foil and paper together into a previously determined shape which depends on the mold previously installed in press machine 87. Press machine 87 may be a standard press machine used for making conventional aluminum foil pans. Paper covered metallic pan 603 is output from press machine 87. Referring back to FIG. 6a, it can be seen that the inside corners of the paper covered pan 603 are folded and crimped to accommodate the shape of the mold in press machine 87. The edges of paper covered pans 603 are also folded and/or crimped. The many folds and crimps attach to paper 602 which retains the shape and stability of baking paper 602 inside metallic pan 601.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The term "baking paper" as used herein is paper designed to withstand up to 250 degrees Celsius used for lining baking pans while baking or roasting.

The term "upper surface" as used herein refers to the concave surface of a pan normally configured to hold food items while baking or roasting.

The articles "a", "an" is used herein, such as "a roller", "a pan", "a paper" have the meaning of "one or more" that is "one or more rollers", "one or more pans" and "one or more papers".

The present application is gender neutral and personal pronouns 'he' and 'she' are used herein interchangeably.

Although selected features of the present invention have been shown and described, it is to be understood the present invention is not limited to the described features. Instead, it is to be appreciated that changes may be made to these features without departing from the principles and spirit of the invention, the scope of which is defined by the claims and the equivalents thereof.

While the invention has been described with respect to a limited number of embodiments, it will be appreciated that many variations, modifications and other applications of the invention may be made.

What is claimed is:

1. A method for manufacturing a paper covered pan including a metallic pan having a previously determined shape and paper inside the metallic pan covering an inside surface of the metallic pan, the method comprising:
   mounting on a first roller a first roll of metallic foil;
   mounting on a second roller a second roll of paper;
   simultaneous feeding together the metallic foil from the first roll and the paper from the second roll;
   driving the metallic foil and the paper together into a press machine; and
   pressing together the metallic foil and the paper thereby manufacturing the paper covered pan including the metallic pan having the previously determined shape and the paper covering the inside surface of the metallic pan, the paper retaining shape corresponding to the shape of the metallic pan, wherein the paper covered pan includes crimps formed during said pressing to accommodate to the previously determined shape, wherein the paper is attached within the crimps of metallic foil of the paper covered pan.

2. The method, according to claim 1, further comprising:
   attaching the metallic pan to the paper by crimping edges of the metallic foil together with the paper while said pressing together the metallic foil and the paper.

3. The method, according to claim 1, further comprising:
   attaching the metallic pan to the paper by crimping the metallic foil together with the paper while said pressing together the metallic foil and the paper, thereby producing the paper covered pan with the paper attached by crimps formed in inside corners thereof during said pressing to accommodate to the previously determined shape.

4. The method, according to claim 1, further comprising:
   attaching the metallic pan to the paper by folding the metallic foil together with the paper while said pressing together the metallic foil and the paper, thereby producing the paper covered pan with the paper attached by folds formed during said pressing to accommodate to the previously determined shape.

5. The method, according to claim 1, further comprising:
   die cutting the metallic foil together with the paper.

6. The method, according to claim 1, wherein the metallic foil is composed of an alloy substantially of aluminum.

7. The method, according to claim 1, wherein the paper is a baking paper configured to withstand baking temperatures.

8. A paper covered pan including a metallic pan having a previously determined shape and paper inside the metallic pan and covering an inside surface of the metallic pan, the paper covered pan manufactured by a process comprising:
   mounting on a first roller a first roll of metallic foil;
   mounting on a second roller a second roll of paper;
   simultaneous feeding the metallic foil from the first roll and the paper from the second roll;
   driving the metallic foil and the paper together into a press machine;
   pressing together the metallic foil and the paper thereby manufacturing the paper covered pan having the previously determined shape and the paper covering the inside surface of the metallic pan, wherein the paper covered pan includes crimps formed during said pressing to accommodate to the previously determined shape, wherein the paper is attached within the crimps of metallic foil of the paper covered pan.

9. The paper covered pan, according to claim 8, manufactured by the process further comprising:
   attaching the metallic pan to the paper by crimping edges of the metallic foil together with the paper while said pressing together the metallic foil and the paper.

10. The paper covered pan, according to claim 8, manufactured by the process further comprising:
    attaching the metallic pan to the paper by crimping the metallic foil together with the paper while said pressing together the metallic foil and the paper, thereby producing the paper covered pan with the paper attached by crimps formed in inside corners thereof during said pressing to accommodate to the previously determined shape.

11. The paper covered pan, according to claim 8, manufactured by the process further comprising:
    attaching the metallic pan to the paper by folding the metallic foil together with the paper while said pressing together the metallic foil and the paper, thereby producing the paper covered pan with the paper attached by folds formed during said pressing to accommodate to the previously determined shape.

12. The paper covered pan, according to claim 8, manufactured by the process further comprising:
    die cutting the metallic foil together with the paper.

13. A paper covered pan comprising:
    a metallic pan having an upper surface including a cavity and an upper lip surrounding the cavity; and
    paper covering said upper surface inside the cavity and the paper covering the upper lip of the metallic pan, wherein the paper covered pan includes crimps formed during pressing to accommodate to a previously determined shape, wherein the paper is attached within the crimps of metallic foil of the paper covered pan.

14. The paper covered pan, of claim 13, wherein the paper retains a shape corresponding to a shape of the metallic pan.

15. The paper covered pan, of claim 13, wherein the metallic foil is composed of an alloy substantially of aluminum.

16. The paper covered pan, of claim 13, wherein the paper is a baking paper configured to withstand baking temperatures.

17. The paper covered pan, of claim 13, wherein the crimps are created by pressing the metallic foil with the paper during manufacture of the covered pan from the metallic foil.

* * * * *